United States Patent
Collins et al.

(10) Patent No.: US 11,463,603 B2
(45) Date of Patent: Oct. 4, 2022

(54) METHODS AND SYSTEMS FOR SCREENING A CONTINUOUS-TONE IMAGE TO PRODUCE AN OUTPUT IMAGE TO BE PRINTED ON A CURVED SURFACE

(71) Applicant: Global Inkjet Systems Limited, Cambridge (GB)

(72) Inventors: Philip D A Collins, Cambridge (GB); Nicholas Campbell Geddes, Lidgate (GB)

(73) Assignee: Global Inkjet Systems Limited, Cambridge (GB)

( * ) Notice: Subject to any disclaimer, the term of this patent is extended or adjusted under 35 U.S.C. 154(b) by 0 days.

(21) Appl. No.: 17/312,959

(22) PCT Filed: Sep. 12, 2019

(86) PCT No.: PCT/GB2019/052548
§ 371 (c)(1),
(2) Date: Jun. 11, 2021

(87) PCT Pub. No.: WO2020/120929
PCT Pub. Date: Jun. 18, 2020

(65) Prior Publication Data
US 2022/0051062 A1 Feb. 17, 2022

(30) Foreign Application Priority Data
Dec. 11, 2018 (GB) ..................... 1820121

(51) Int. Cl.
*H04N 1/405* (2006.01)
*B41J 2/52* (2006.01)
(Continued)

(52) U.S. Cl.
CPC .............. *H04N 1/4052* (2013.01); *B41J 2/52* (2013.01); *G06K 15/021* (2013.01);
(Continued)

(58) Field of Classification Search
CPC .............. G06K 15/021; G06K 15/102; G06K 15/1881; B41J 2/52; H04N 1/405–4058; H04N 1/52
See application file for complete search history.

(56) References Cited

U.S. PATENT DOCUMENTS

| | | | |
|---|---|---|---|
| 2010/0060939 A1 | 3/2010 | Lau et al. | |
| 2015/0178599 A1* | 6/2015 | Ushiyama | G06K 15/107 358/1.8 |
| 2016/0366301 A1 | 12/2016 | Schweid et al. | |

FOREIGN PATENT DOCUMENTS

| EP | 1051024 A2 | 11/2000 |
|---|---|---|
| EP | 1696659 A2 | 8/2006 |

(Continued)

OTHER PUBLICATIONS

International Search Report and Written Opinion in Related International Application No. PCT/GB2019/052548; dated Jun. 18, 2020, 8 pages.

*Primary Examiner* — Scott A Rogers
(74) *Attorney, Agent, or Firm* — Miller Canfield

(57) ABSTRACT

A method of screening a continuous-tone image is configured to produce an output image to be printed on a surface. The continuous-tone image comprises a plurality of pixels having respective corresponding intended print locations. The method includes
selecting a first sequence comprising a subset of the plurality of intended print locations, the first sequence being selected based on properties of the plurality of intended print locations.
For each intended print location in the first sequence, the method also includes identifying the corresponding pixel in the continuous-tone image to obtain a second
(Continued)

sequence for an error diffusion process comprising the identified corresponding pixels in the continuous-tone image.

20 Claims, 4 Drawing Sheets

(51) Int. Cl.
  *G06K 15/02* (2006.01)
  *G06K 15/10* (2006.01)
  *H04N 1/52* (2006.01)
  *B41J 3/407* (2006.01)
(52) U.S. Cl.
  CPC ....... *G06K 15/102* (2013.01); *G06K 15/1881* (2013.01); *H04N 1/52* (2013.01); *B41J 3/4073* (2013.01)

(56) References Cited

FOREIGN PATENT DOCUMENTS

| | | | |
|---|---|---|---|
| GB | 2060492 | A | 5/1981 |
| WO | 2018063153 | A1 | 4/2018 |

\* cited by examiner

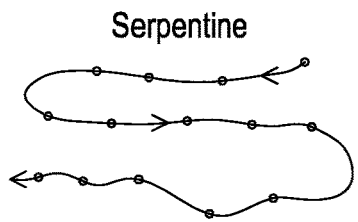
Figure 1a
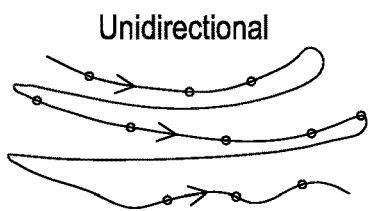
Figure 1b
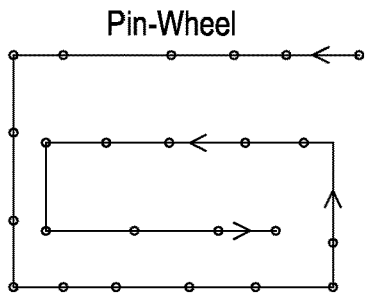
Figure 1c
| Direction | Weight |
|---|---|
| East (E) | 7/16 |
| South-East (SE) | 1/16 |
| South (S) | 5/16 |
| South-West (SW) | 3/16 |
Figure 2

METHODS AND SYSTEMS FOR SCREENING A CONTINUOUS-TONE IMAGE TO PRODUCE AN OUTPUT IMAGE TO BE PRINTED ON A CURVED SURFACE

CROSS-REFERENCE TO RELATED APPLICATIONS

This application is a U.S. National Phase Patent Application and claims priority to and the benefit of International Application Number PCT/GB2019/052548. filed on Sep. 12, 2019. which claims priority to and the benefit of GB Patent Application Number GB1820121.0 62/362.012. filed on Dec. 11, 2018. the entire contents of all of which are incorporated by reference in their entirety herein.

TECHNICAL FIELD

Aspects of the present disclosure generally relate to image data processing and in particular to screening continuous-tone images.

BACKGROUND

"Screening" generally refers to a process of approximating images such as continuous-tone ("contone") digital images to be output by devices that have limited tone range. In inkjet printing, error diffusion is a type of screening used to simulate multiple colour or greyscale shades with a smaller number of greylevel or binary dot values. For example, a printer capable of only printing black dots may simulate shades of grey using error diffusion.

Well-known diffusion algorithms such as the Floyd-Steinberg error diffusion algorithm may be used to propagate errors between neighbouring pixels so that the average local grey value matches the continuous-tone input value closely. Whilst such algorithms work well in many cases, they are not appropriate in cases where most or all of the neighbouring pixels are non-printing, i.e. a "sparse" image. A "sparse" image is defined as one in which at least one pixel does not correspond to an intended printing location on the target surface.

Sparse images may be used for example in situations where an inkjet printhead is printing onto a curved surface. This is because images to be printed are usually in the form of a bitmap, i.e. information representing a rectilinear array of y rows of x pixels. Such rectilinear images cannot be readily mapped to a curved surface such as a sphere for example. In such situations it may be advantageous to provide images which include non-printing pixels. This means that adjacent intended print locations on the curved surface might be separated by non-printing pixels in the image to be printed.

Sparse image data may be managed, for example, using a single bit mask layer which holds a flag for each pixel to indicate whether it is in a printing position. For each pixel in an image to be printed, swathe data indicates if the pixel is in a printing position (that is, whether or not to jet a dot) and the pixel value (how large a dot to jet). Alternatively, sparse data may be provided as a list of pixel values and corresponding location coordinates, wherein some intermediate location coordinates have no provided pixel values.

SUMMARY

According to a first independent aspect of the disclosure, there is provided a method of screening a continuous-tone image to produce an output image to be printed on a surface, wherein the continuous-tone image comprises a plurality of pixels having respective corresponding intended print locations;

the method comprising the steps of:
selecting a first sequence comprising a subset of the plurality of intended print locations, the first sequence being selected based on properties of the plurality of intended print locations;
for each intended print location in the first sequence, identifying the corresponding pixel in the continuous-tone image to obtain a second sequence for an error diffusion process comprising the identified corresponding pixels in the continuous-tone image.

In the prior art, the selected sequence for the error diffusion process is based on processing a sequence in the continuous-tone image provided because there is an assumption that all pixels in the continuous-tone image will be printed in an equivalent rectilinear arrangement. In contrast, the present invention processes a first sequence of intended printed locations only which is more efficient.

The selected sequence for error diffusion has an effect on print artefacts in the printed image. By choosing the sequence based on the properties of the intended print locations rather than based on the properties of the provided continuous-tone image, the quality of the printed output is optimised.

In a dependent aspect, at least one pixel in the plurality of continuous-tone image pixels does not have a corresponding intended print location.

Such continuous-tone images are referred to as "sparse" images.

In a dependent aspect, the method further comprises the step of applying the error diffusion process to the second sequence.

The second sequence is a sequence of pixels in the continuous-tone image.

In a dependent aspect, the first sequence is selected based on relative geometric relationships between the intended print locations.

For example, the geometric relationship may be a substantially scanning path which may be unidirectional or serpentine, or a pin-wheel path through the intended print locations as respectively shown in FIGS. 1A to 1C. In the prior art, pin-wheel paths are used to partition a screening task into a set of subtasks which can be carried out in parallel. Alternatively, on curved surfaces, other tessellating shapes can be advantageous. For example, spiral paths in the shapes of hexagons and pentagons can be tessellated on the surfaces of spheroids to provide a similar computational advantage.

In a dependent aspect, the output image is a greylevel image and the error diffusion process is a continuous-tone error diffusion process according to a set of diffusion-weight relationships, each diffusion-weight relationship comprising an error diffusion rule for identifying at least one continuous-tone error recipient pixel corresponding to a continuous-tone error donor pixel in the second sequence, the diffusion-weight relationship further comprising a respective weight for diffusing errors from the at least one continuous-tone error donor pixel to the at least one continuous-tone error recipient pixel in the continuous-tone image.

The set of diffusion-weight relationships is usually an error-diffusion table as shown for example in FIG. 2.

In a dependent aspect, the error diffusion rule is based on properties of the plurality of intended print locations. In a further dependent aspect, the error diffusion rule is based on relative geometric relationships between the intended print locations.

For example, if choosing to implement an error diffusion method similar to Floyd-Steinberg, it will be necessary to identify near-neighbouring intended print locations corresponding to the east, south, south-east, south-west pixels identified in the Floyd-Steinberg method. This can be done by identifying an acceptable range of angles and distances within which to search for a matching intended print location. The matching intended print location will of course be an approximation to that implied in Floyd-Steinberg, but the error diffusion process is robust to such variations. Similar approximations are possible for other error-diffusion schemes.

In a dependent aspect, the set of diffusion-weight relationships is selected from a plurality of sets of diffusion-weight relationships. In a dependent aspect, the set of diffusion-weight relationships is selected based on properties of the plurality of intended print locations. In a further dependent aspect, the set of diffusion-weight relationships is selected based on relative geometric relationships between the intended print locations.

In many cases it is advantageous to switch sets of diffusion-weight relationships (tables) for example when changing direction on serpentine or pin-wheel paths, or at the edge or corner of the images.

In a dependent aspect, for each of the at least one continuous-tone error donor pixels, the error diffusion process comprises the steps of:
 i. Determine an input continuous-tone value;
 ii. Select an output greylevel value which will produce the closest printed continuous-tone value;
 iii. Determine the output greylevel image pixel which corresponds to the at least one continuous-tone error donor pixel;
 iv. Set the value of said output greylevel image pixel to said output greylevel value;
 v. Determine the printed continuous-tone value for the output greylevel value;
 vi. Calculate a total continuous-tone error by subtracting the printed continuous-tone value from the input continuous-tone value;
 vii. Identify at least one continuous-tone error recipient pixel using the at least one error diffusion rule;
 viii. For each identified continuous-tone error recipient pixel:
  identify the respective weight from the at least one diffusion-weight relationship;
  calculate the continuous-tone error to be diffused by multiplying the total continuous-tone error by said respective weight; and
  diffuse the continuous-tone error to the each identified continuous-tone error recipient pixel.

In a dependent aspect, the step of determining an input continuous-tone value comprises the steps of:
 for the identified continuous-tone error donor pixel, calculate the sum of the diffused continuous-tone errors for which said identified continuous-tone error donor pixel was the continuous-tone error recipient pixel; and
 add the continuous-tone value of said continuous-tone error donor pixel to said sum.

In a dependent aspect, the step of providing first and second substantially parallel paths of intended print locations, the first sequence being selected along the first path in a processing direction, wherein for a current intended print location on the first path, the corresponding continuous-tone image pixel is identified as the continuous-tone error donor pixel, wherein the set of diffusion-weight relationships is provided according to a method comprising the steps of:
 (a) provide an east diffusion-weight relationship in which the error diffusion rule selects the next intended print location along the first path in the processing direction;
 (b) provide a south diffusion-weight relationship in which the error diffusion rule selects the intended print location along the second path which is closest to the current intended print location,
 (c) provide a south-east diffusion-weight relationship in which the error diffusion rule selects the next intended print location along the second path in the processing direction after the intended print location selected for the south diffusion-weight relationship;
 (d) provide a south-west diffusion-weight relationship in which the error diffusion rule selects the previous intended print location along the second path in the processing direction before the intended print location selected for the south diffusion-weight relationship;
 (e) to thereby identify the continuous-tone error recipient pixels as those corresponding to the intended print locations identified in steps (a) to (d); and
 (f) assign respective weights to each of the diffusion-weight relationships in the set.

In an inkjet system for printing on curved surfaces, the paths followed by adjacent nozzles are substantially parallel but because of the curved surface geometry, the intended print locations are not aligned in the direction perpendicular to the paths (cross-process direction). Therefore it is advantageous to identify intended print locations which approximate to those used in known error-diffusion algorithms.

In a dependent aspect, in step (f), the respective weight for the east diffusion-weight relationship is assigned as 7/16, respective weight for the south diffusion-weight relationship is assigned as 5/16, the respective weight for the south-west diffusion-weight relationship is assigned as 3/16, and the respective weight for the south-east diffusion-weight relationship is assigned as 1/16.

Those skilled in the art will recognise these weights as those from the Floyd-Steinberg algorithm. It will be understood that other error-diffusion schemes might be used.

In a dependent aspect, the step of determining an input continuous-tone value further comprises the step of adding a noise value randomly selected from a plurality of noise values.

It is well known that digital screening algorithms can be prone to visible artefacts, and adding noise is an effective method of disrupting the formation of such artefacts.

In a dependent aspect, there is provided a machine-readable medium that provides instructions which, when executed by a machine, cause the machine to perform the steps of the methods described above.

According to a second independent aspect of the invention, there is provided a system for screening a continuous-tone image to produce an output image to be printed on a surface, wherein the continuous-tone image comprises a plurality of pixels having respective corresponding intended print locations;
 the system comprising a processor configured to:
  select a first sequence comprising a subset of the plurality of intended print locations, the first sequence being selected based on properties of the plurality of intended print locations;
  for each intended print location in the first sequence, identify the corresponding pixel in the continuous-tone image to obtain a second sequence for an error diffusion process comprising the identified corresponding pixels in the continuous-tone image.

Preferred features of each independent aspect are provided in the dependent claims.

In a preferred dependent aspect, there is provided a printing system comprising a system as claimed in the system claims. It will be appreciated by the person skilled in the art that by "printing system" we understand any form of depositing or mark making system comprising, for example an inkjet printhead, a laser etching device, a mechanical scribe or punch. Accordingly, an "image" in the context of the invention describes any arrangement of marks to be made on the surface of an object. This may include, but is not limited to, graphics, text, a functional material, a coating or pre-treatment, etching or resistant chemical, adhesive or biological material.

BRIEF DESCRIPTION OF THE DRAWINGS

Aspects of the present invention will now be described, by way of example only, with reference to the accompanying figures, in which:

FIGS. 1A to 1C show examples of geometric relationships for selecting sequences of intended print locations to be used in error diffusion algorithms;

FIG. 2 is a direction-weight table according to the Floyd-Steinberg algorithm;

DETAILED DESCRIPTION

A continuous-tone image 10 represents a set of data indicating intensity values for a set of pixels. Typically continuous-tone images are in the form of a bitmap, i.e. information representing a rectilinear array of y rows of x pixels each containing an intensity value. In the prior art, the relative geometry of the continuous-tone image corresponds directly to the relative geometry of the target image on a flat surface, and each continuous-tone pixel corresponds to an intended print location.

Figure 3:
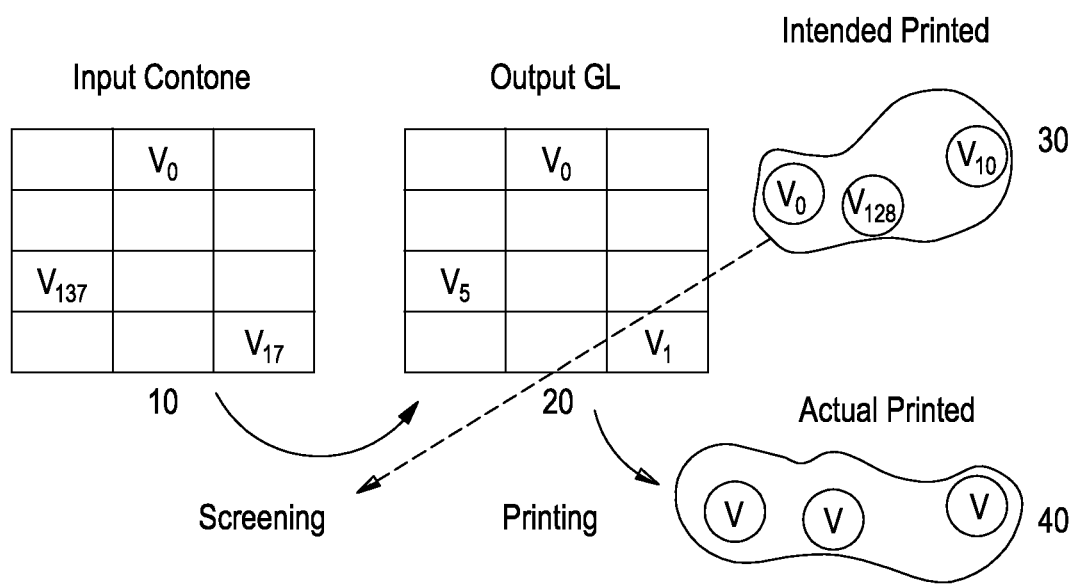
FIG. 3 schematically represents a sparse continuous-tone image to be screened as an output greylevel image, its intended print locations on a surface to be printed and the actual printed locations.

With reference to FIG. 3, when printing onto a curved surface, it may be desirable to create a sparse continuous-tone image 10 in which one or more pixels will not be printed. This may be represented by a continuous-tone image 10 bitmap and an accompanying bitmap of printing pixels, but other representations are possible.

Known methods of screening the continuous-tone image 10, to obtain an output greylevel image 20, involve processing continuous-tone image pixels in a defined sequence. A pseudo code example of this processing may be as follows:
1. if not at the Eastern limit of a row, move one pixel East;
2. else, if not at the Southern limit of the image, move one row South, and to the West-most pixel;
3. else complete.

In a non-sparse image corresponding to a x-y array, the image pixels correspond precisely to intended printing locations on the surface. Accordingly, in the case of non-sparse images, the same geometric relationship applies to a sequence of corresponding intended print locations. In contrast, in the case of a sparse image 10 as shown in FIG. 3, the same geometric relationship does not apply, and hence known methods of error diffusion do not work. In the example of FIG. 3, the intended printed locations 30 do not have the same properties (i.e. relative geometric relationships) as that of the continuous-tone image 10. The intended print locations are to be printed as actual print locations (printed image 40), it will be appreciated, subject to inherent system errors.

Error Diffusion

Error diffusion is a type of screening. Known error diffusion algorithms typically process a continuous-tone image having a plurality of pixels, taking each pixel in turn, in a linear fashion, to form a sequence of pixels. Examples of geometric relationships for selecting sequences for error-diffusion are shown in FIGS. 1A to 1C.

A "greylevel" is a pixel value representing one of a small number of intensity levels suitable for printing, typically in the range 0 to 15. In contrast, continuous-tone values represent a larger number of intensity levels which will be more accurate representations of intensity than greyscale values—for example, in the range 0 to 255. A printed continuous-tone value represents the value of intensity in the continuous-tone range most closely representing the intensity printed on the surface.

The difference between the pixel's continuous-tone value and the printed continuous-tone value is referred to as an error. To better approximate the continuous-tone values, the error is distributed by error diffusion algorithms to neighbouring pixels that have not been processed yet.

A method of screening to diffuse errors from one continuous-tone pixel can be represented by a table listing directions and weights to apply. For example, the Table in FIG. 2, there is shown the case of the Floyd-Steinberg algorithm, processing pixels in an Easterly direction. The weights propagate the error according to a geometric relationship.

The geometric relationship underpinning this method is that there is a pixel one step away in each direction. In a non-sparse image corresponding to a x-y array, the image pixels correspond precisely to intended print locations on the surface. Accordingly, in the case of non-sparse images, the same geometric relationship applies to a sequence of corresponding intended print locations. At locations in the continuous-tone image where continuous-tone error recipient pixels are not available (for example, at the edges of the image) a different table will normally be applied.

While Floyd-Steinberg filters represent a widely used error-diffusion technique, a number of other algorithms have been proposed, which represent variations of the Floyd-Steinberg algorithm. Well known variants of error diffusion use an equivalent method, but different direction-weight tables.

EXAMPLE

Figure 4:
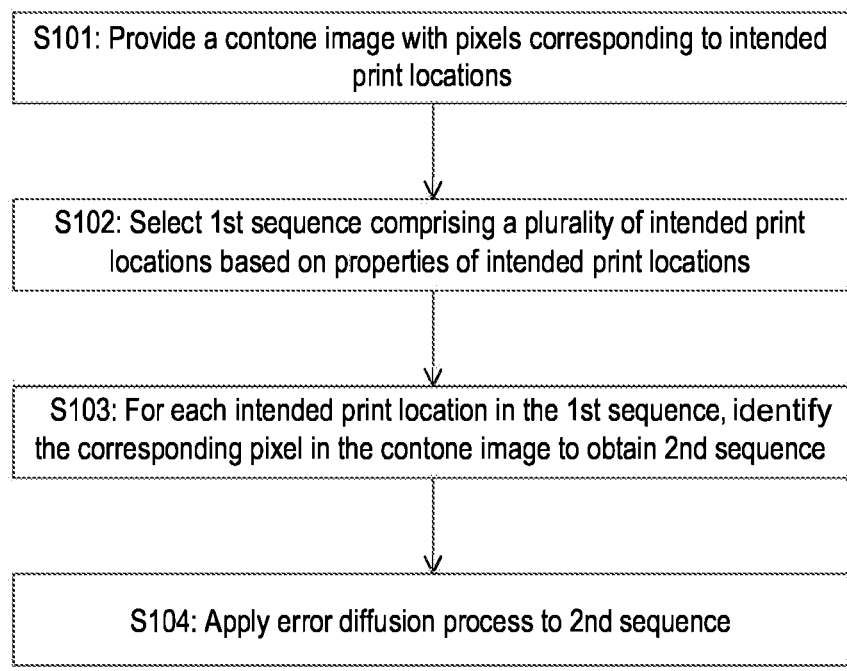
FIG. 4 is a flow diagram of a screening method according to embodiments of the present invention.

With reference to FIG. 4, in a method of screening, a continuous-tone image 10 is provided, the image having pixels corresponding to intended print locations 30 (step S101). At step S102, a first sequence is selected, the first sequence comprising a plurality of intended print locations based on properties of intended print locations 30. For example, the first sequence may be selected as a serpentine, unidirectional, or pin-wheel sequence of intended print locations 30.

At step S103, for each intended print location in the first sequence, the corresponding pixel in the continuous-tone image 10 is identified to obtain a second sequence. At step S104, an error diffusion process is applied using the second sequence.

Figure 5:
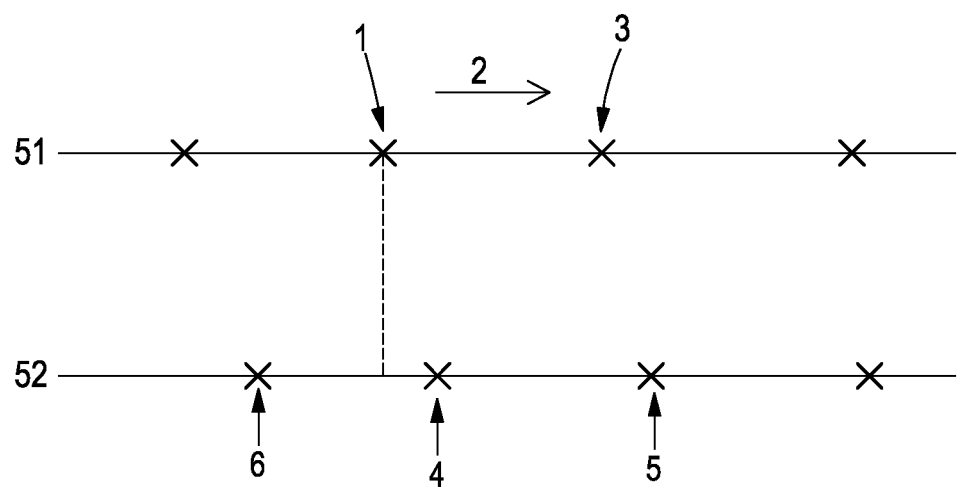
FIG. 5 shows an example of a screening method which is advantageous when printing on a curved surface.

In an example as shown in FIG. 5, an inkjet printing system is printing on a curved surface. The intended printed locations (1, 3, 4, 5, 6) are provided along substantially parallel paths 51, 52. Whilst the paths 51, 52 followed by adjacent printhead nozzles are substantially parallel, because of the curved surface geometry, the intended print locations are not aligned in the direction perpendicular to the paths (cross-process direction).

The first sequence of intended print locations is selected along the first path 51 in a processing direction (indicated by arrow 2). For a current intended print location 1 on the first path 51, the corresponding continuous-tone image pixel is identified as the continuous-tone error donor pixel and the set of diffusion-weight relationships is provided according to the following method steps:

(a) provide an east diffusion-weight relationship in which the error diffusion rule selects the next intended print location 3 along the first path 51 in the processing direction 2;

(b) provide a south diffusion-weight relationship in which the error diffusion rule selects the intended print location 4 along the second path 52 which is closest to the current intended print location 1, (c) provide a south-east diffusion-weight relationship in which the error diffusion rule selects the next intended print location 5 along the second path 52 in the processing direction 2 after the intended print location 4 selected for the south diffusion-weight relationship;

(d) provide a south-west diffusion-weight relationship in which the error diffusion rule selects the previous intended print location 6 along the second path 52 in the processing direction before the intended print location 4 selected for the south diffusion-weight relationship;

The continuous-tone error recipient pixels are then identified as those corresponding to the intended print locations 3,4,5,6 as identified in steps (a) to (d). Respective weights are then assigned to each of the diffusion-weight relationships in the set.

It will be appreciated that boundary conditions may vary depending on the print path. Where possible, errors should be propagated across localised boundaries to avoid greyscale discontinuities. For example, at the end of a row of a swathe which loops back to its starting point, errors can be propagated from the end of a row to the start of the next row because it will be a near neighbour.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

For example, and for the avoidance of doubt, an image in the context of the present invention describes a target arrangement of toner, ink, varnish or another substance on a substrate as produced by a print system, or target deposition of items as placed by depositors, or marking of a substrate such as using a laser or tool, where the substrate may be flat, curved or other geometric shape and could be formed of any material, including fluids. It may include, but is not limited to, graphics, text, a functional material, a coating or pre-treatment, etching or resistant chemicals, adhesive, and biological material.

The invention claimed is:

1. A method of screening a continuous-tone image to produce an output image to be printed on a curved surface, wherein the continuous-tone image comprises a plurality of pixels having respective corresponding intended print locations on the curved surface that do not automatically correspond to actual print locations, the method comprising the steps of:

selecting a first sequence comprising a subset of the plurality of intended print locations, the first sequence being selected based on properties of the plurality of intended print locations;

for each intended print location in the first sequence, identifying the corresponding pixel in the continuous-tone image to obtain a second sequence for an error diffusion process comprising the identified corresponding pixels in the continuous-tone image.

2. The method according to claim 1, wherein at least one pixel in the plurality of continuous-tone image pixels does not have a corresponding intended print location.

3. The method according to claim 1, the method further comprising the step of applying the error diffusion process to the second sequence.

4. The method according to claim 1, wherein the first sequence is selected based on relative geometric relationships between the intended print locations.

5. The method according to claim 1, wherein the output image is a greylevel image and the error diffusion process is a continuous-tone error diffusion process according to a set of diffusion-weight relationships, each diffusion-weight relationship comprising an error diffusion rule for identifying at least one continuous-tone error recipient pixel corresponding to a continuous-tone error donor pixel in the second sequence, the diffusion-weight relationship further comprising a respective weight for diffusing errors from the at least one continuous-tone error donor pixel to the at least one continuous-tone error recipient pixel in the continuous-tone image.

6. The method according to claim 5, wherein the error diffusion rule is based on properties of the plurality of intended print locations.

7. The method according to claim 6, wherein the error diffusion rule is based on relative geometric relationships between the intended print locations.

8. The method according to claim 5, wherein the set of diffusion-weight relationships is selected from a plurality of sets of diffusion-weight relationships.

9. The method according to claim 8, wherein the set of diffusion-weight relationships is selected based on properties of the plurality of intended print locations.

10. The method according to claim 9, wherein the set of diffusion-weight relationships is selected based on relative geometric relationships between the intended print locations.

11. The method according to claim 5, wherein, for each of the at least one continuous-tone error donor pixels, the error diffusion process comprises the steps of:

i. Determine an input continuous-tone value;
ii. Select an output greylevel value which will produce the closest printed continuous-tone value;
iii. Determine the output greylevel image pixel which corresponds to the at least one continuous-tone error donor pixel;

iv. Set the value of said output greylevel image pixel to said output greylevel value;
v. Determine the printed continuous-tone value for the output greylevel value;
vi. Calculate a total continuous-tone error by subtracting the printed continuous-tone value from the input continuous-tone value;
vii. Identify at least one continuous-tone error recipient pixel using the at least one error diffusion rule; and
viii. For each identified continuous-tone error recipient pixel:
identify the respective weight from the at least one diffusion-weight relationship;
calculate the continuous-tone error to be diffused by multiplying the total continuous-tone error by said respective weight; and
diffuse the continuous-tone error to the each identified continuous-tone error recipient pixel.

12. The method according to claim 11, wherein the step of determining an input continuous-tone value comprises the steps of:
for the identified continuous-tone error donor pixel, calculate the sum of the diffused continuous-tone errors for which said identified continuous-tone error donor pixel was the continuous-tone error recipient pixel; and
add the continuous-tone value of said continuous-tone error donor pixel to said sum.

13. The method according to claim 5, further comprising the step of providing first and second substantially parallel paths of intended print locations, the first sequence being selected along the first path in a processing direction, wherein for a current intended print location on the first path, the corresponding continuous-tone image pixel is identified as the continuous-tone error donor pixel, wherein the set of diffusion-weight relationships is provided according to a method comprising the steps of:
(a) provide an east diffusion-weight relationship in which the error diffusion rule selects the next intended print location along the first path in the processing direction;
(b) provide a south diffusion-weight relationship in which the error diffusion rule selects the intended print location along the second path which is closest to the current intended print location,
(c) provide a south-east diffusion-weight relationship in which the error diffusion rule selects the next intended print location along the second path in the processing direction after the intended print location selected for the south diffusion-weight relationship;
(d) provide a south-west diffusion-weight relationship in which the error diffusion rule selects the previous intended print location along the second path in the processing direction before the intended print location selected for the south diffusion-weight relationship;
(e) to thereby identify the continuous-tone error recipient pixels as those corresponding to the intended print locations identified in steps (a) to (d); and
(f) assign respective weights to each of the diffusion-weight relationships in the set.

14. The method according to claim 13, wherein, in step (f), the respective weight for The east diffusion-weight relationship is assigned as 7/16, respective weight for the south diffusion-weight relationship is assigned as 5/16, the respective weight for the south-west diffusion-weight relationship is assigned as 3/16, and the respective weight for the south-east diffusion-weight relationship is assigned as 1/16.

15. The method according to claim 12, wherein the step of determining an input continuous-tone value further comprises the step of adding a noise value randomly selected from a plurality of noise values.

16. A non-transitory machine-readable medium that provides instructions which, when executed by a machine, cause the machine to perform all the steps of claim 1.

17. A system for screening a continuous-tone image to produce an output image to be printed on a curved surface, wherein the continuous-tone image comprises a plurality of pixels having respective corresponding intended print locations on the curved surface that do not automatically correspond to actual print locations, the system comprising a processor configured to:
select a first sequence comprising a subset of the plurality of intended print locations, the first sequence being selected based on properties of the plurality of intended print locations;
for each intended print location in the first sequence, identify the corresponding pixel in the continuous-tone image to obtain a second sequence for an error diffusion process comprising the identified corresponding pixels in the continuous-tone image.

18. The system according to claim 17, wherein at least one pixel in the plurality of continuous-tone image pixels does not have a corresponding intended print location.

19. The system according to claim 17, the processor being further configured to apply the error diffusion process to the second sequence.

20. A printing system comprising a system according to claim 17, wherein the system is a subsystem of a printing system.

* * * * *